3,845,164
VINYLCHLORIDE COMPOSITION CONTAINING A BUTADIENE BASED LATEX COMPONENT AND A STYRENE BASED GRAFT COMPONENT
Takeshi Goto and Eiji Sakaoka, Tokyo, Japan, assignors to Denki Kagaku Kogyo K.K., Tokyo, Japan
No Drawing. Filed Oct. 27, 1972, Ser. No. 301,300
Int. Cl. C08f 15/00, 19/00
U.S. Cl. 260—876 R                6 Claims

ABSTRACT OF THE DISCLOSURE

A composition prepared by emulsion polymerizing 55–85 weight percent 1,3-butadiene, 5–30 weight percent styrene, 3–40 weight percent methylmethacrylate and 0.1–1 weight percent of a divinyl compound to form a latex of elastic particles characterized by a swelling of 5–25, a benzene insoluble content of greater than 90%, and an average diameter of $0.05$–$0.2\mu$ and graft-polymerizing thereon a monomer mixture of 3–46 weight percent methyl methacrylate, 51–90 weight percent styrene and 3–9 weight percent acrylonitrile, and blending 5–25 parts by weight of said graft copolymer with 95–75 parts by weight of a vinylchloride polymer.

BACKGROUND OF THE INVENTION

Field of the Invention

This invention relates to a vinylchloride resin composition and the preparation of a graft copolymer thereof.

Description of the Prior Art

Various compositions are known which have the advantageous characteristics of good impact strength, good tensile strength, good transparency, and the like, and whose main components are comprised of a vinylchloride polymer and a reinforcement portion. This portion may consist of an acrylonitrile-butadiene copolymer, a conjugated diene rubber grafted with styrene and acrylonitrile or a conjugated diene rubber grafted with styrene and methyl methacrylate. However, compositions with a high impact strength have a relatively low transparency and develop stress whitening upon bending. On the other hand, compositions with good transparency and which do not develop stress whitening upon bending possess relatively low impact strength. In addition, uneven surfaces are formed by blow molding of the compositions.

A need exists, therefore, for a composition which has a high impact strength, a relatively high transparency and which does not develop stress whitening upon the application of a bending force, and which can be blow molded without formation of uneven or irregular surfaces.

SUMMARY OF THE INVENTION

Accordingly, it is an object of the invention to provide a preparation of a composition which possesses an improved balance in its impact strength, transparency, weather durability, and gloss characteristics and which possesses the ability not to develop stress whitening upon bending.

This object and other objects of this invention can be achieved by providing a composition by emulsion polymerizing 55–85 weight percent 1,3-butadiene, 5–30 weight percent styrene, 3–40 weight percent methyl methacrylate and 0.1–1 weight percent of a divinyl compound to form a latex of elastic particles characterized by a swelling index of 5–25, a benzene insoluble content of greater than 90%, and an average diameter of $0.05$–$0.2\mu$ and graft-polymerizing thereon a monomer mixture of 3–46 weight percent methyl methacrylate, 51–90 weight percent styrene and 3–9 weight percent acrylonitrile, and then blending 5–25 parts by weight of said graft copolyer with 95–75 parts by weight of a vinylchloride polymer.

DESCRIPTION OF THE PREFERRED EMBODIMENTS

A monomer mixture of 55–85% 1,3-butadiene, 5–30% styrene and 3–40% methyl methacrylate is admixed with 0.1–1.0% divinyl compound and the mixture is copolymerized in the presence of a catalyst such as the persulfate ion by an emulsion polymerization method to form an aqueous latex consisting of elastic particles with a swelling index of 5–25 and where the particles have an average diameter of $0.05$–$0.2\mu$ and consist of a component which is more than 90% insoluble in benzene. (Hereafter in the specification, the terms "%" and "part," respectively, mean "percent by weight" and "part by weight.")

If the 1,3-butadiene content of the mixture is less than 55%, the resulting product has an insufficient impact strength. On the other hand, if the 1,3-butadiene content is greater than 85%, the resulting polymer easily develops stress whitening upon bending as well as developing pitted surfaces. The amounts of styrene and methyl methacrylate copolymerized with butadiene are important factors in influencing the properties of the product as well as the presence of a divinyl compound. A latex of a 1,3-butadiene-styrene copolymer or a latex of a 1,3-butadiene-methyl methacrylate copolymer both admixed with a vinylchloride resin does not yield compositions with balanced high impact strength and transparency. If the amount of styrene copolymerized with 1,3-butadiene and methyl methacrylate is less than 5%, the impact strength of the resulting composition as a latex is inferior. On the other hand, if the amount of styrene copolymerized with 1,3-butadiene and methyl methacrylate is greater than 30%, the resulting composition develops stress whitening upon bending. If the amount of methyl methacrylate copolymerized is less than 3%, the transparency and gloss of the resulting composition is inferior. If the amount of methyl methacrylate copolymerized is greater than 40%, the strength of the resulting composition is relatively low.

The quantity of divinyl compound used in the preparation of the latex is present in an amount from 0.1 to 1.0% of the monomer content of the mixture. It is necessary to have the divinyl compound present in the mixture from the initiation of the polymerization reaction. If no divinyl compound is initially present, the surface characteristics of the finished compositions are decreased. The reason for this is not clear, but it is considered that the microstructure of the cross-linkage resulting from the divinyl compound contributes to the appearance of the finished composition. Suitable divinyl compounds include divinyl benzene, diacryl phthalate, polyethyleneglycol dimethacrylate ester, and the like. If the amount of the divinyl compound present is less than 0.1%, the smoothness of the finished composition is inferior. On the other hand, if the amount of the divinyl compound present is greater than 1.0%, the number of fish eyes on the surface of the finished composition increases. The average diameter of the particles of the latex ranges from $0.05\mu$ to $0.2\mu$. If the average diameter of the particles is less than $0.05\mu$, the transparency of the finished composition is good, but the impact strength decreases. On the other hand, if the average diameter of the particles is greater than $0.2\mu$, the transparency of the finished composition deteriorates.

The properties of the rubber of the latex prepared by adding a 2% aqueous solution of sodium chloride to said latex with stirring, coagulating the latex particles, filtering, washing and drying, are as follows:

| | | |
|---|---|---|
| 100% modulus | 15-25 kg./cm.$^2$ | ASTM-D-412-67 |
| Tensile strength | 25-32 kg./cm.$^2$ | ASTM-D-412-67 |
| Elongation | 100-200% | ASTM-D-412-67 |
| Hardness (shore A) | 50-60 | ASTM-D-676-67 |
| Permanent set | 0.7-1.5% | ASTM-D-412-67 |
| Tear strength (BTYPL) | 10-13 kg./cm. | ASTM-D-624-67 |

The preferred polymerization catalysts include aqueous persulfates such as potassium persulfate and ammonium persulfate. The amount of catalyst present is in the range of 0.01-5 parts, especially 0.05-3 parts, to 100 parts of the mixture of butadiene, styrene and methyl methacrylate. Suitable molecular weight regulators used for the preparation of this invention include alkyl mercaptans such as methyl mercaptan, ethyl mercaptan, n-dodecyl mercaptan, t-dodecyl mercaptan. Preferably, a molecular weight regulator is admixed with 100 parts of the monomer mixture in amounts ranging from 0.01-2 parts, especially 0.05-1 part.

Suitable emulsifiers include metal salts of fatty acids such as sodium stearate, potassium stearate, sodium palmitate, potassium palmitate, potassium oleate, sodium oleate and the sodium or potassium salt of rosin acid or mixtures thereof. Preferably, an emulsifier is admixed with 100 parts of the monomer mixture in amounts ranging from 0.5-10 parts, especially 1-5 parts. Suitable emulsion stabilizers include surface active agents, such as alkyl benzene sulfonates. Preferably, a surface active agent is admixed with 100 parts of the monomer mixture in amounts ranging from 0.01-2 parts, especially 0.05-1 part. Suitable viscosity regulators for the latex include aqueous solutions of alkali metal salts such as sodium chloride, potassium chloride and calcium chloride. Preferably, a viscosity regulator is admixed with 100 parts of the monomer mixture in amounts ranging from 0.05-5 parts, especially 0.1-3 parts.

The ratio of water to the monomer mixture ranges from 50-500 parts, preferably 80-300 parts, of deoxygenated water to 100 parts of the monomer mixture. A suitable polymerization temperature falls within the range of 30-90° C., especially 40-80° C. Polymerization times are dependent upon the polymerization temperature, but normally fall within the range of 8-30 hours, preferably 10-20 hours. The pH of the latex solution is in the range of 5-10, especially 6-9.

The graft polymer according to this invention can be synthesized by the following process. 35-65 parts of the rubber prepared by said process is grafted with 65-35 parts of a monomer mixture. If the amount of the rubber is outside the range of 35-65 parts, the processability of the finished composition deteriorates resulting in a product which forms fish eyes and develops stress whitening upon bending or which possesses a lower impact strength. Thus, the purpose of this invention is defeated if these limits are not maintained. The relative quantities of the monomers grafted to the latex particles range from 3-46% methyl methacrylate, 51-90% styrene and 3-9% acrylonitrile. If the quantity of methyl methacrylate present is less than 3%, the light transmittance of the finished composition decreases. On the other hand, if the quantity of methyl methacrylate is greater than 46%, the impact strength decreases. If the styrene content is less than 51%, the processability of the finished composition decreases. On the other hand, if it is greater than 90%, stress whitening upon bending increases. If the acrylonitrile content is less than 3%, the transparency of the finished composition decreases. On the other hand, if the acrylonitrile is greater than 9%, the transparency of the finished composition decreases and the gloss of the finished product is inferior. If the quantities of all three types of monomers used are outside of the above-mentioned ranges, the transparency of the finished product decreases.

The graft polymerization of the mixture of the three types of monomers is conducted by an emulsion polymerization method by adding a catalyst, if necessary, a reducing agent, an emulsifier, a molecule weight regulator and an emulsion stabilizer to said latex. Suitable catalysts include water soluble persulfate catalysts such as potassium persulfate, ammonium persulfate; organic peroxides such as benzoyl peroxide, lauroyl peroxide, diisopropyl benzoyl peroxide, dicumyl peroxide, and the like. Preferably, the amount of catalyst employed ranges from 0.001-5 parts, especially 0.1-3 parts per 100 parts of the mixture of methyl methacrylate, styrene and acrylonitrile. The reducing agent can be a mixture of 0.0001-0.05 part, especially 0.001-0.01 part, of ferric sulfate; 0.001-0.1 part, especially 0.005-0.05 part of tetrasodium ethylenediamine tetraacetate; and 0.05-0.7 part, especially 0.1-0.4 part, of formaldehyde-sodium sulfoxylate to 100 parts of the graft monomers in a redox catalyst system.

The pH of the polymerization system ranges from 5-9, especially 6-8. If the pH is outside of the indicated range, hydrolysis of methyl methacrylate occurs to yield methacrylic acid resulting in an unstable system. The emulsion stabilizer can be present in amounts ranging from 0.1 to 1 part, especially 0.3 to 0.8 part of a surface active agent such as a sulfonate or a sulfate. The polymerization temperature can be in a range from 30-90° C., especially 40-80° C. The polymerization time is dependent upon the polymerization temperature and is in a range from 3-12 hours, especially 4-8 hours. The resulting graft copolymer is separated from the emulsion to form a powdery graft copolymer as follows. The emulsion of the resulting graft copolymer is admixed with an electrolyte salt such as sodium chloride, calcium chloride, magnesium sulfate, calcium sulfate or aluminum chloride. If necessary, an acid such as hydrochloric acid, sulfuric acid or acetic acid may be added to the emulsion treated with an electrolyte salt to precipitate the graft copolymer. The amount of electrolyte salt added is in a range from 1-20 parts, especially 5-15 parts per 100 parts of the solid graft copolymer. The acid adjusts the pH of the emulsion to a range of 1-7, especially 3-6. The coagulated, graft copolymer slurry is preferably heated at 50-100° C., especially 60-80° C., for 5-120 minutes, especially 10-60 minutes, to complete coagulation of the copolymer. The graft copolymer is filtered, dehydrated and then dried at 30-90° C., especially 40-80° C. The resulting graft copolymer is a fine, white powder, and is admixed with a vinylchloride type resin in a suitable amount depending upon the required impact strength of the product. Preferably, 5-25 parts of the graft copolymer are admixed with 95-75 parts of the vinylchloride polymer.

If the amount of vinylchloride polymer added is greater than 95 parts, the strength of the product is inferior. If the vinylchloride polymer is present in quantities less than 75 parts, the transparency of the product is inferior. Blending of the components can be conducted by a conventional blending method using a Banbury mixer, a hot roller, or an extruder, to uniformly mix the components. The components can be admixed with a color agent, a thermal stabilizer, a photostabilizer and a lubricant.

The vinylchloride polymer can be polyvinylchloride, or a copolymer containing more than 90% vinylchloride units. Suitable vinylchloride copolymers include vinylchloride-vinylacetate, vinylchloride-ethylene, and vinylchloride-propylene.

Having generally described the invention, a more complete understanding can be obtained by reference to certain specific examples, which are provided herein for purposes of illustration only and are not intended to be limiting unless otherwise specified. In the following examples, the reference letter "M" represents methyl methacrylate; the reference letter "S" represents styrene, the reference letter "A" represents acrylonitrile, and the reference letter "B" represents 1,3-butadiene.

EXAMPLE 1

75 parts of butadiene, 5 parts of methyl methacrylate and 20 parts of styrene were copolymerized in an autoclave at 60° C. for 20 hours with stirring in the presence of 0.4 part of divinyl benzene and other additives which included 0.1 part of potassium peroxide, 0.2 part of t-dodecyl mercaptan, 3 parts of sodium stearate, 0.3 part of KCl, 0.1 part of sodium alkylbenzene sulfonate and 200 parts of water to yield a latex from an emulsion copolymerization. Unreacted monomers were recovered in a vacuum. The physical properties of the resulting latex were as follows: particle size, 0.08μ. The properties of the rubber from the latex prepared by adding 2% aqueous sodium chloride to said latex with stirring, coagulating the latex particles, filtering, washing and drying, are as follows:

| | | | |
|---|---|---|---|
| Benzene insoluble portion | 98% | 100% modulus | 20.6 kg./cm.² |
| Do | 98% | Tensile strength | 30.8 kg./cm.² |
| Swelling index | 13 | Elongation | 180% |
| Do | 13 | Hardness | 53. |
| Refractive index | 1.5308 | Permanent set | 0.9%. |
| Do | 1.5308 | Tear strength | 11.0 kg./cm. |

The latex emulsion containing 100 parts of a rubber-like solid was admixed with 0.50 part of sodium lauryl sulfate as an emulsion stabilizer. 140 parts of deoxygenated distilled water was added to the emulsion in an autoclave. A solution of 0.06 part of tetra sodium ethylenediamine tetraacetate, 0.03 part of ferric sulfate and 0.2 part of sodium formaldehyde sulfoxylate in 100 parts of water, was further charged to the autoclave. The mixture was stirred at 60° C., and 80 parts of a monomer mixture of 34%:60%:6% of M:S:A and 0.1 part of diisopropyl benzene hydroperoxide as a catalyst were continuously added during the 6 hour reaction period. The mixture was maintained at 60° C. for 2 hours to complete the polymerization.

After the reaction, a quantity of 1N-HCl equivalent to the sodium stearate present in the mixture and 2,000 parts of a 2% sodium chloride solution were added to the resulting reaction mixture with stirring to coagulate the graft copolymer. Coagulation was completed by heating at 70° C. for 10 minutes. The product was filtered and dried to yield the powdery graft copolymer. The resulting graft copolymer was blended in various amounts with commercially available polyvinyl chloride ($\bar{p}=700$). 100 parts of the resulting blend and 3 parts of a stannous maleate type thermal stabilizer, 0.6 part of butyl stearate as a lubricant, 0.3 part of liquid paraffin and 0.3 part of wax were admixed and kneaded at 150° C. for 5 minutes by a roll mill. The sheet prepared by kneading, was pressed in a mold at 170° C. under 150 kg./cm.² g. for 10 minutes. The formula of each blend and the characteristics thereof are shown in Table I.

TABLE I

| | Experiment No. | | | | | | | |
|---|---|---|---|---|---|---|---|---|
| | *1 | 2 | 3 | 4 | *5 | *6 | *7 | *8 |
| Item: | | | | | | | | |
| PVC ($\bar{p}$=700) (parts) | 100 | 90 | 85 | 80 | 70 | 85 | 85 | 85 |
| Graft copolymer (parts) | 0 | 10 | 15 | 20 | 30 | 15 | 15 | 15 |
| Roll mill: | | | | | | | | |
| Izod impact strength (kg.-cm./cm.²) | **5 | 64 | 68 | 72 | **56 | 64 | **58 | **22 |
| Tensile strength (kg./cm.²) | 600 | 470 | 440 | 410 | 380 | 400 | 410 | 500 |
| Elongation (percent) | 85 | 130 | 180 | 200 | 230 | 180 | 190 | 100 |
| Blow shaping: | | | | | | | | |
| Light transmittance (percent) | 90 | 88 | 86 | 86 | 81 | **65 | 70 | **80 |
| Stress whitening upon bending (∠°) | 180 | 180 | 180 | 180 | 160 | 160 | 170 | 170 |
| Smoothness of surface | O | O | O | O | O | **X | △ | **X |
| Number of fish eyes per 100 cm.² of surface | 20 | 20 | 21 | 22 | 24 | **60 | **43 | **81 |

Smoothness of the surface of the products is indicated by the following symbols.—O=smooth; △=slightly uneven; X=uneven.

NOTES: 1 *=reference; 2 Experiment *1=only PVC was used; 3 Experiment *6=the rubber was the same as those of experiments 2–5, but the monomer mixture for grafting was different and had an M:S:A mixture of 34:50:16 (rubber: monomer mixture=100:80); 4 Experiment *7=the rubber was a copolymer of S:B=25:75 and the monomer mixture for grafting had an M:S:A mixture of 39:55:6 (percent) (rubber:monomer mixture=100:80); 5 Experiment *8=the rubber was a copolymer of M:B:S=40:50:10 and the monomer mixture for grafting had an M:S:A mixture of 10:84:6 (rubber:monomer mixture=100:60); 6 Izod impact strength=ASTM-D-256-56; 7 Tensile strength and elongation=ASTM-D-638-68; 8 Light transmittance=the transmittance of a pressed plate having a thickness of 1 mm. was measured at 600mμ.; 9 Stress whitening upon bending=the sheet with a thickness of 0.5 mm. was bent; 10 Smoothness of surface=the composition was kneaded by a henschel mixer and was blow shaped; 11 Number of fish eyes=number of fish eyes per 100 cm.²; 12 $\bar{p}=$average polymerization degree; 13 **=undesirable value.

EXAMPLE 2

The monomer mixtures shown in Table II were grafted onto 100 parts of the latex particles from the emulsion of the latex of Example 1. The graft copolymer was separated by coagulating and was washed and dried. 15 parts of the graft copolymer was added to 85 parts of polyvinylchloride and the mixture was blended and pressed to form sheets. The physical properties of the sheets are shown in Table II.

TABLE II

| Experiment No. | Rubber formula M:B:S (percent) | Graft monomer formula M:S:A (percent) | Graft monomer/ latex particles | Izod impact strength (kg.-cm./cm.²) | Light transmittance (percent) | Stress whitening upon bending (∠°) |
|---|---|---|---|---|---|---|
| 9* | 5:75:20 | 45:55:0 | 150/100 | **44 | 79 | **150 |
| 10* | 5:75:20 | 44:56:0 | 120/100 | **48 | 78 | **150 |
| 11* | 5:75:20 | 41:59:0 | 100/100 | **53 | 78 | **145 |
| 12* | 5:75:20 | 39:61:0 | 80/100 | **58 | 75 | **140 |
| 13* | 5:75:20 | 34:60:0 | 60/100 | 62 | 71 | **140 |
| 14 | 5:75:20 | 41:53:6 | 150/100 | 60 | 88 | 180 |
| 15 | 5:75:20 | 39:55:6 | 120/100 | 64 | 86 | 180 |
| 16 | 5:75:20 | 36:58:6 | 100/100 | 68 | 86 | 180 |
| 17 | 5:75:20 | 34:60:6 | 80/100 | 70 | 85 | 180 |
| 18 | 5:75:20 | 29:65:6 | 60/100 | 78 | 83 | 180 |
| 19* | 5:75:20 | 34:51:15 | 150/100 | **30 | 84 | 180 |
| 20* | 5:75:20 | 32:53:15 | 120/100 | **36 | 81 | 180 |
| 21* | 5:75:20 | 29:56:15 | 100/100 | **41 | **78 | 180 |
| 22* | 5:75:20 | 27:58:15 | 80/100 | **46 | **76 | 175 |
| 23* | 5:75:20 | 22:63:15 | 60/100 | **52 | **76 | 175 |

***See footnotes bottom of Table I.

EXAMPLE 3

The process of Example 1 was repeated except that the formulas of the latex and the formulas of the graft monomers were changed. The physical properties of the resulting pressed sheets were measured, and the results are shown in Table III.

TABLE III

| Experiment No. | Rubber formula M:B:S (percent) | Graft monomer formula M:S:A (percent) | Graft monomer/ latex particles | Izod impact strength (kg.·cm./cm.$^2$) | Light transmittance (percent) | Stress whitening upon bending ($\angle °$) |
|---|---|---|---|---|---|---|
| 24 | 30:60:10 | 11:83:6 | 60/100 | 66 | 88 | 180 |
| 25 | 20:60:20 | 24:70:6 | 60/100 | 66 | 87 | 180 |
| 26 | 15:60:25 | 32:60:6 | 60/100 | 66 | 87 | 180 |
| 27 | 5:75:20 | 34:60:6 | 80/100 | 70 | 85 | 180 |
| 28 | 15:75:10 | 21:73:6 | 80/100 | 69 | 85 | 180 |
| 29 | 5:80:15 | 28:66:6 | 80/100 | 67 | 86 | 180 |
| 30 | 10:80:10 | 23:71:6 | 80/100 | 68 | 84 | 180 |
| 31 | 10:80:10 | 14:80:6 | 60/100 | 71 | 83 | 180 |

EXAMPLE 4

The amounts of divinyl benzene were changed in the copolymerization reaction for preparing the emulsion latex as disclosed in Example 1. 15 parts of the graft copolymer were blended with 85 parts of polyvinyl chloride and the physical properties of the product were measured as disclosed in Example 1. The results are shown in Table IV.

TABLE IV

| Experiment No. | Amount of divinyl benzene in the rubber component (percent) | Izod impact strength (kg.·cm./cm.$^2$) | Light transmittance (percent) | Blow-shaping Smoothness | Number of fish eyes per 100 cm.$^2$ of surface |
|---|---|---|---|---|---|
| 32* | 0 | 66 | 70 | X** | **81 |
| 33* | 0.05 | 64 | 81 | A** | **70 |
| 34 | 0.1 | 66 | 83 | O | 17 |
| 35 | 0.4 | 68 | 85 | O | 18 |
| 36 | 0.8 | 68 | 86 | O | 18 |
| 37 | 1.0 | 66 | 86 | O | 19 |
| 38* | 1.5 | **40 | 85 | O | 20 |
| 39* | 2.0 | **37 | 84 | O | 22 |

* ** See footnotes and symbols bottom of Table I.

EXAMPLE 5

The latex prepared as disclosed in Example 1 was used as a seed polymer and a latex with average particle diameter of 0.2$\mu$ was prepared by the seed polymerization method.

|  | Parts |
|---|---|
| Latex of Example 1 (33.3% of solid) | 15 |
| Butadiene | 71.2 |
| Methyl methacrylate | 4.8 |
| Styrene | 19 |
| Potassium persulfate | 0.095 |
| Divinyl benzene | 0.76 |
| t-Dodecyl mercaptan | 0.19 |
| Sodium stearate | 0.85 |
| Deoxygenated water | 190 |

The copolymerization was conducted at 60° C. for 20 hours. The physical properties of the resulting copolymer latex were as follows:

| Average particle diameter | 0.2$\mu$ |
|---|---|
| Benzene insoluble component | 99% |
| Swelling index | 14 |
| Refractive index | 1.5310 |

In accordance with Example 1, a graft polymerization was conducted by using the latex. The resulting graft copolymer was coagulated, washed and dried. 15 parts of the powdery graft copolymer was blended with 85 parts of polyvinylchloride ($\bar{p}=700$) to form a sheet as disclosed in Example 1. The physical properties are shown in Table V.

TABLE V

Experiment No. 40:

| Izod impact strength (kg.·cm./cm.$^2$) | 78 |
|---|---|
| Light transmittance (percent) | 81 |
| Stress whitening upon bending ($\angle °$) | 170 |

The composition of the blend of the vinylchloride type resin and the graft copolymer prepared by a seed polymerization method from the latex having an average particle dimeter of 0.2$\mu$ shows an excellent impact strength.

EXAMPLE 6

In accordance with Example 1, a latex with different average particle diameters was prepared and then graft polymerized, coagulated, washed and dried. 15 parts of the powdery graft copolymer were admixed with 85 parts polyvinyl chloride ($\bar{p}=700$) as disclosed in Example 1. The physical properties of the sheets thereof are shown in Table VI.

TABLE VI

| Experiment No. | Average particle diameter of the latex ($\mu$) | Izod impact strength (kg.cm./cm.$^2$) | Light transmittance (percent) | Stress whitening upon bending ($\angle °$) |
|---|---|---|---|---|
| 41* | 0.04 | *42 | 87 | 180 |
| 42 | 0.08 | 63 | 86 | 180 |
| 43 | 0.12 | 76 | 85 | 180 |
| 44 | 0.18 | 82 | 82 | 170 |
| 45* | 0.23 | 92 | *61 | *130 |

* **See footnotes bottom of Table I.

Formula of rubber M:B:S=5:75:20 (100 parts)
Formula of monomer mixture for grafting M:S:A=34: 60:6 (80 parts).

Having now fully described the invention, it will be apparent to one of ordinary skill in the art that many changes and modifications can be made thereto without departing from the spirit or scope of the invention as set forth herein.

Accordingly, what is claimed as new and intended to be covered by Letters Patent is:

1. A mixed resin composition consisting essentially of:
   (A) 5–25 parts by weight of a graft copolymer formed from
       (1) a latex of a copolymer of 0.1–1 weight percent of a divinyl compound, 55–85 weight percent of 1,3-butadiene, 5–30 weight percent of styrene, and 3–40 weight percent of methyl methacrylate which is characterized by a swelling index of 5–25, a benzene insoluble content of greater than 90% and an average particle diameter of 0.05–0.2$\mu$, which has grafted thereto,
       (2) a copolymer of 3–46 weight percent of methyl methacrylate, 51–90 weight percent of styrene and 3–9 weight percent of acrylonitrile, and
   (B) 95–75 parts by weight of polyvinylchloride or a copolymer containing more than 90% vinyl chloride units selected from the group consisting of vinyl chloride-vinyl acetate, vinyl chloride-ethylene and vinyl chlorine-propylene.

2. The mixed resin composition of Claim 1, wherein 35–65 parts of said latex has been graft polymerized with 65–35 parts by weight of copolymer (2).

3. The mixed resin composition of Claim 1, wherein in said latex (1), said butadiene is present in amounts of from 55–70 weight percent, said methyl methacrylate is present in amounts of from 3–40 weight percent and said styrene is present in amounts of from 5–30 weight percent.

4. The mixed resin composition of Claim 3, wherein said butadiene is present in amounts of 70–85 weight percent, said methyl methacrylate is present in amounts of 3–25 weight percent and said styrene is present in amounts of 5–27 weight percent.

5. A process for preparing a mixed resin composition comprising:
(A) preparing a latex by emulsion copolymerizing 55–85 weight percent 1,3-butadiene, 5–30 weight percent styrene, 3–40 weight percent methyl methacrylate and 0.1–1 weight percent of a divinyl compound,
(B) graft-copolymerizing 65–35 parts by weight of a mixture of 3–46 weight percent methyl methacrylate, 51–90 weight percent styrene and 3–9 weight percent acrylonitrile, with 35–65 parts by weight of said emulsion,
(C) separating said graft copolymer, and
(D) blending 5–25 parts by weight of said graft copolymer to 95–75 parts by weight of a vinylchloride polymer.

6. The process of Claim 5, wherein said divinyl compound is divinyl benzene, diacryl phthalate or polyethyleneglycol dimethacrylate ester.

References Cited
UNITED STATES PATENTS

| | | | |
|---|---|---|---|
| 3,671,610 | 6/1972 | Amagi et al. | 260—876 R |
| 3,678,132 | 7/1972 | Isogawa et al. | 260—876 R |
| 3,652,727 | 3/1972 | Yonetu et al. | 260—876 R |

MURRAY TILLMAN, Primary Examiner

R. B. TURER, Assistant Examiner

U.S. Cl. X.R.

260—23 AR, 23 S, 23 XA, 45.75 K, 880, 881, 885, 886, 887, 892, 893, 898, 899, 901